US010885127B2

(12) United States Patent
Pandey et al.

(10) Patent No.: US 10,885,127 B2
(45) Date of Patent: Jan. 5, 2021

(54) MACHINE-LEARNING TO ALARM OR PRE-EMPT QUERY EXECUTION

(71) Applicant: International Business Machines Corporation, Armonk, NY (US)

(72) Inventors: Rohit Pandey, C V Raman Nagar (IN); Gaurav Saxena, Bangalore (IN); Azad Khan, Kadubheesanahalli (IN); Kapish Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 16/053,359

(22) Filed: Aug. 2, 2018

(65) Prior Publication Data

US 2020/0042647 A1 Feb. 6, 2020

(51) Int. Cl.
*G06F 16/951* (2019.01)
*G06N 20/00* (2019.01)
*G06F 16/903* (2019.01)

(52) U.S. Cl.
CPC ...... *G06F 16/951* (2019.01); *G06F 16/90335* (2019.01); *G06N 20/00* (2019.01)

(58) Field of Classification Search
CPC .. G06F 16/951; G06F 16/90335; G06N 20/00
USPC ...................................................... 707/769
See application file for complete search history.

(56) References Cited

U.S. PATENT DOCUMENTS

| 2008/0065588 A1* | 3/2008 | Aldrich ............. G06F 16/24547 |
| 2011/0055202 A1* | 3/2011 | Heimendinger ...... G06F 16/245 707/721 |
| 2012/0144234 A1 | 6/2012 | Clark et al. |
| 2016/0179877 A1 | 6/2016 | Koerner et al. |
| 2017/0365020 A1 | 12/2017 | Banerjee et al. |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

* cited by examiner

*Primary Examiner* — Robert W Beausoliel, Jr.
*Assistant Examiner* — Pedro J Santos
(74) *Attorney, Agent, or Firm* — Heslin Rothenberg Farley & Mesiti P.C.; Robert Shatto, Esq.

(57) ABSTRACT

A method, computer program product, and a system where a processor(s) monitors communications between one or more clients to a query engine, to identify requests to execute queries on the database resource. Based on identifying a requested query, the processor(s) applies cognitive analysis algorithms to parse components of the requested query, to identify components in the requested query that indicate an execution success measure for the requested query. The processor(s) determines the execution success measure for the requested query and assigns an execution action to the requested query: pre-empting the requested query or executing the requested query. The processor(s) facilitates this action on the requested query.

20 Claims, 6 Drawing Sheets

MACHINE-LEARNING TO ALARM OR PRE-EMPT QUERY EXECUTION

BACKGROUND

Structured Query Language (SQL) is a coding language that forms the basis for many queries executed in primarily relational databases. As writing queries in SQL is user friendly and many tools provide users with a front end to construct SQL queries, many inefficiencies within enterprise systems can be traced to the execution of inefficiently constructed and/or incorrect queries. When a SQL query is deployed, there exists uncertainly related to its performance in both development and production environments. For example, when a SQL statement is dispatched from an application, it may not be known whether the statement will run or it will abort due to an error or due to timing out. Additionally, when a new query is executed, it may not be known how long the query will take to execute, as existing performance-monitoring tools on the application side tend to check the performance of a new query after it has executed and tune the query based on the initial execution statistics. It may also not be known at the time that a query is executed whether the query will hog system resources (due to being poorly constructed or incompatible with the resources it accesses in some way). When this information is gleaned only after executing the query, the detrimental effects to the system cannot be avoided and instead, are mitigated after the fact.

SUMMARY

Shortcomings of the prior art are overcome and additional advantages are provided through the provision of a method for preventing problematic queries from executing on a database. The method includes, for instance: monitoring, by one or more processors, in a computing system comprising a database resource, communications between one or more clients to a query engine, to identify requests from the one or more clients to the query engine to execute queries on the database resource; based on identifying a requested query destined for execution by the query engine, applying, by the one or more processors, cognitive analysis algorithms to parse components of the requested query, to identify components in the requested query that indicate an execution success measure for the requested query; determining, by the one or more processors, the execution success measure for the requested query and assigning an execution action to the requested query, based on the execution success measure, wherein the execution action is selected from the group consisting of: pre-empting the requested query and executing the requested query; and facilitating, by the one or more processors, the execution action, on the requested query.

Shortcomings of the prior art are overcome and additional advantages are provided through the provision of a computer program product for preventing execution of problematic queries on a database. The computer program product comprises a storage medium readable by a processing circuit and storing instructions for execution by the processing circuit for performing a method. The method includes, for instance: monitoring, by one or more processors, in a computing system comprising a database resource, communications between one or more clients to a query engine, to identify requests from the one or more clients to the query engine to execute queries on the database resource; based on identifying a requested query destined for execution by the query engine, applying, by the one or more processors, cognitive analysis algorithms to parse components of the requested query, to identify components in the requested query that indicate an execution success measure for the requested query; determining, by the one or more processors, the execution success measure for the requested query and assigning an execution action to the requested query, based on the execution success measure, wherein the execution action is selected from the group consisting of: pre-emptying the requested query and executing the requested query; and facilitating, by the one or more processors, the execution action, on the requested query.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
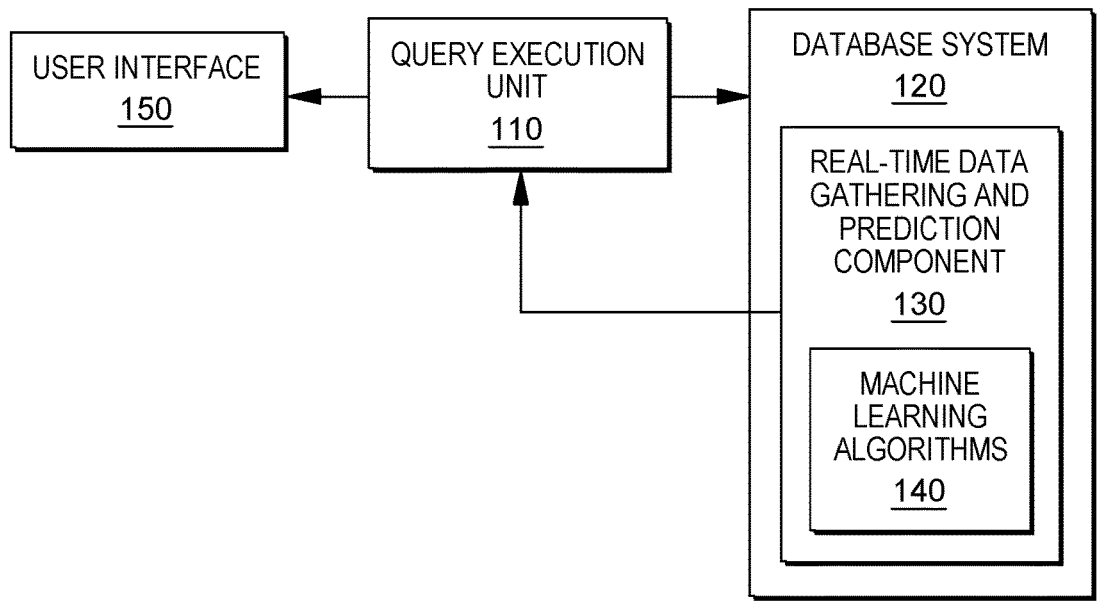
FIG. 1 is an illustration of various aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
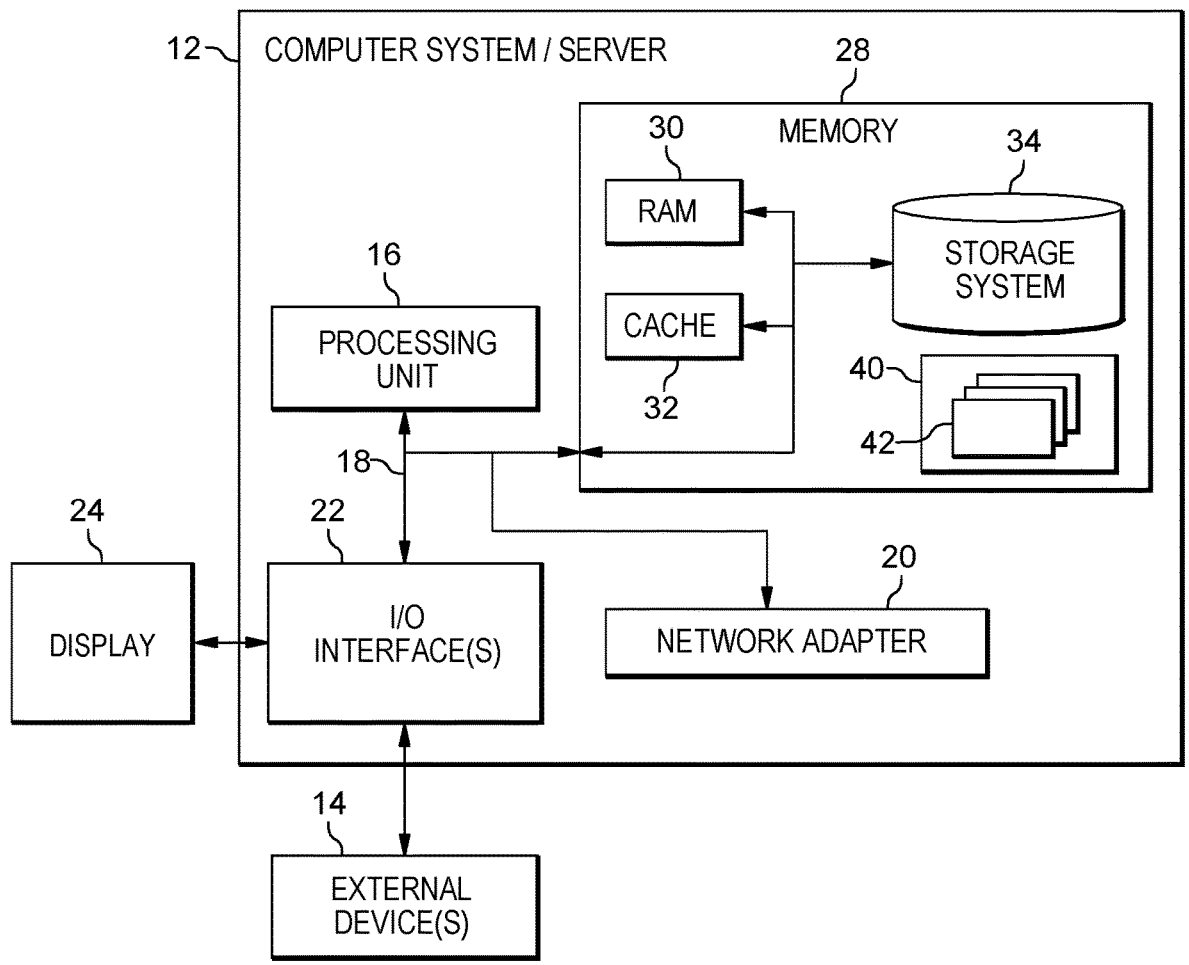
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, can be stored in memory 28.

Embodiments of the present invention include a computer-implemented method, a computer program product, and a computer system that include program code executed on at least one processing circuit that facilitates activities related to halting and/or proceeding with execution of a query, based on machine-learning from data obtained in advance of the execution. In embodiments of the present invention, the program code machine-learns, based on utilizing execution statistics (e.g., data obtained by the program code during different phases of the described analysis and decision, related to execution of the query), to determine, before executing a requested query, whether to execute the query. Thus, in some embodiments of the present invention, the program code can alarm and/or preempt query execution. The program code can control this mechanism utilizing a configurable handshake between a client (running the application calling or formulating the query) and a server (comprising resources upon which the query would execute).

Aspects of various embodiments of the present invention are inextricably linked to computing and provide improvements over existing query performance improvement tools. Aspects are inextricably linked to computing because these aspects address an issue that is unique to computing, mitigating database performance, and by extension, computing system performance, by preventing the execution of queries that would cause performance issues, if executed. These aspects represent significant improvements to current database issue mitigation techniques because existing techniques focus on database recovery, after a problematic query has already executed and has caused issues. The avoidance offered by aspects of the present invention is a more efficient use of computing resources. In embodiments of the present invention, in contrast to existing mitigation techniques that address issues after the issues have occurred, program code executing on at least one computing resources prevents execution of queries that will ultimately fail, if submitted to the database for executions, preventing database errors from occurring as a result of the submission. The program code determines whether to prevent execution of a particular query, in advance of the request to execute a particular query, by dynamically machine learning from the execution of previous queries in a database. The program code utilizes the leaning to make an intelligent decision on the execution or the preemption of the particular query. In determining whether to execute a query in advance of the execution, the program code provides various advantages over existing systems of query optimization and monitoring, including but not limited to: 1) assisting in providing better queries in subsequent executions; 2) alarming bad queries based on a threshold set by default or by the user; and 3) preempting queries, if the query is calculated to be hogging the system, to prevent denial of service to other queries.

In some embodiments of the present invention, unlike existing query optimization and performance monitoring systems for databases, rather than tune a query based on statistics collected after the execution of the query, embodiments of the present invention analyze and learn from intermediate data to determine whether to execute a requested query. The program code analyzes and learns from data (i.e., intermediate data) that is based on the working of a current system in which the query would be executed. The program code analyzes data in different phases of query execution such that the data analyzed is not just the result of the execution, as relied upon in existing approaches. Data analyzed by the program code in embodiments of the present invention can include, but is not limited to: 1) costs of queries, including various options (paths, ways) computed by a query optimizer; 2) actual time taken to complete queries, which the program code in embodiments of the present invention can utilize to approximate an actual time for a requested query, based on different time intervals; 3) variations in workloads on the computing system, at different times; and/or 4) relevant data detailing failed queries (e.g., failed queries may include table(s), type of join(s), and/or filter condition(s) included in the requested query, so data regarding failure of these queries can assist the program code in predicting success of a requested query). The prediction of program code in embodiments of the present invention can generate a binary prediction (i.e., success or failure) and based on the binary prediction, the program code can take a binary action (i.e., permit or pre-empt query execution). However, the prediction may also utilize a binning procedure to assign ranks to various queries, based upon predicted changes of success and/or failure. In some embodiments of the present invention, the program code may utilize values in a matrix to represent the presence or absence of various factors affecting successful execution of a query, including factors in the code of the query and/or in the technical environment in which the query requests to be executed, and utilize the matrix to quantify the chance of success or failure of the query.

Embodiments of the present invention also feature flexibility in query analysis and pre-emption execution, providing something more than existing query optimization. In some embodiments of the present invention, the program code can suggest or otherwise facilitate pre-emption of a requested query based on a threshold, by utilizing self-learning during different phases of query execution and optionally, applying a static, user-defined, value. Aspects of the present invention enable program code executing on a processing circuit (e.g., a server) to determine whether to run a requested query, at all, whether to run the query while concurrently issuing at least one warning to a user, and/or whether to decline to run the requested query and to send an error to the user, based on predicted results, including, but not limited to, a predicted cost (actual approximate time) of executing the requested query exceeding a timeout value.

FIG. 1 is an illustration of aspects that comprises some embodiments of the present invention that can be implemented such that the program code can make an intelligent decision on execution or preemption of a particular query in a given one or more databases or other computer resources which can be targeted by execution of a query. The computing resources, both software and hardware, depicted in FIG. 1 are merely offered to depict an example of a possible implementation of certain aspects and not to provide any limitations to possible implementations. As understood by one of skill in the art, the functionality described as part of various modules or units in FIG. 1 can be combined into one or more common module and/or separated out further into additional modules. Thus, FIG. 1 depicts a computing environment 100 that includes both a query execution unit (which includes one or more processors) 110 and a database system 120 comprised of one or more databases, upon which the query execution unit 110 executes queries. FIG. 1 also includes a real-time data gathering and prediction component 130 resident in the database system 120 that provides additional intelligence to the query execution unit 110. The component 130 includes machine learning algorithms 140 to learn from failure reasons and predict failure based on a current condition of a query (queued for execution by the query execution unit 110 and the database system 120). The component 130 works closely with a query optimizer 140 in the query execution unit 110. Upon receiving feedback from the component 130, program code in some embodiments of the present invention, provides the feedback to a user through a user interface 150. Program code generating the user interface 150 and communicating to a user utilizing this interface 150, upon determining that executing a given requested query would be detrimental to the efficiency of the database system 120 (and/or one or more other components of the computing environment 100) prompts a user for confirmation regarding terminating the query request before execution or whether to force execution, despite the determination. The program code can utilize the user interface 150 to alert the user regarding the specific issues anticipated, based on the query execution.

Figure 2:
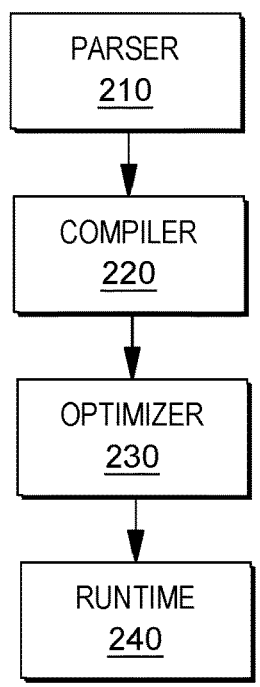
FIG. 2 is an illustration of phases of query execution in a query engine.

FIG. 2 is an illustration of phases of query execution in a query engine 200 in executing queries on databases. FIG. 2 is offered to provide context to the discussion above of the intermediate data that the program code in embodiments of the present invention can utilize to evaluate requested queries. As depicted in FIG. 2, a query engine 200 includes a parser 210, a compiler 220, an optimizer 230, and runtime 240. A requested query is handled by the components of the query engine 200 in this order. The parser 210 is responsible for making a parse call to a database. When an application issues a query (e.g., a SQL statement), the application makes a parse call to a database. During the parse call, the parser 210 checks the statement for syntactic and semantic validity. The parser 210 also determines whether the process issuing the statement has privileges to run it. After parsing the query, the compiler 220 transforms the parsed query (e.g., SQL statement) by executing a parse tree or writing bytecode and executing that. Although the term compiler 220 is sometimes utilized when describing a portion of the execution of a query, this aspect is more akin to interpreting the query, rather than a compiling, in the traditional sense. Thus, the compiler 220 interprets the query. Some compilers 220 can generate an execution plan that describes the execution of the query. The optimizer 230 chooses the most efficient means of executing the query (e.g., SQL statement). For example, if the query is written in SQL, SQL is a nonprocedural language, so the optimizer 230 can merge, reorganize, and/or process the query in any order. Runtime 240 is the actual execution of the query on the database and includes, from a temporal standpoint, the period of time when a program is running, i.e., when the query is executing of the database. Runtime 240 begins when the query is initiated and ends with the completion and/or failure of the query. Because each phase utilizes a set of rules, and generates execution statistics (i.e., data gathered during different phases of query execution) program code in embodiments of the present invention can utilize this intermediate data to predict details of subsequent attempted query executions, in advance of these executions. As will be described in more detail in FIG. 3, program code in embodiments of the present invention can utilize this intermediate data to provide alarms regarding bad queries and/or preempt unwanted corrupt queries.

In some embodiments of the present invention, program code executing on at least one processing circuit performing a cognitive analysis, determines an issue with a query exists, and facilitates an action, including but not limited to, preempting the query, executing the query with a warning, and/or causing the query execution to fail. In some embodiments of the present invention, the program code may interfaces with an existing cognitive analysis tool and solution database in order to obtain the data utilized in the cognitive analysis. In some embodiments of the present invention, the program code updates the aforementioned cognitive tool and/or solution database with the pattern information garnered from determining that a query is problematic and an action should be taken. If the program code determines that a query should not be executed, the program code can register an error and update the aforementioned cognitive tool with the pattern information related to the error. The regular updates to the data provide a machine learning capability that enables the process to increase in efficacy and efficiency, through repeated use.

To perform a cognitive analysis of intermediate data, in some embodiments of the present invention, the program code interfaces with the application programming interfaces (APIs) that are part of a known cognitive agent, such as the IBM Watson® Application Program Interface (API), a product of International Business Machines Corporation, to identify an issue with a requested query. IBM Watson® is a registered trademark of International Business Machines Corporation, Armonk, N.Y., US.

Figure 3:
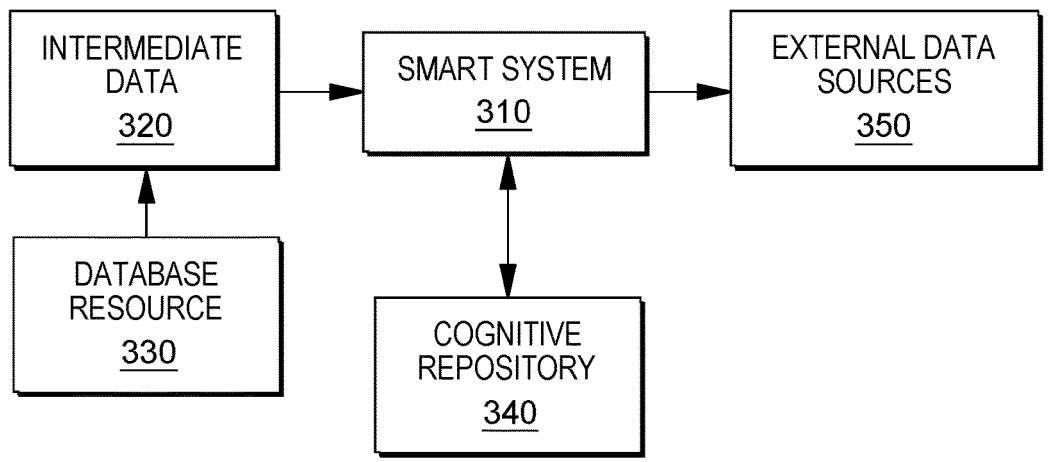
FIG. 3 is an illustration of various aspects of some embodiments of the present invention.

FIG. 3 is an illustration of various aspects of a cognitive analysis system for facilitating actions related to requested queries, utilized in embodiments of the present invention. Based on the machine learning performed by the program code, embodiments of the present invention include a "smart" system 310, which mines intermediate data 320, including statistics produced in all phases of query execution, as illustrated in FIG. 2, to track all queries, both successful and unsuccessful, executed on a database resource 330. The smart system 310 can include cognitive analysis algorithms, which the program code utilizes to analyze collected data. The program code updates the smart system 310 upon execution and/or cancellation of subsequently requested queries, such that the machine learning and cognitive analysis aspects of the program code improve with the additional data. The additional data provide the program code with data regarding database resource 330 usage of different types of queries, based on the execution statistics of these queries. In embodiments of the present invention, the program code can maintain a cognitive repository 340 that provides data utilized in machine learning.

The program code of the smart system 310 continuously learns which queries will adversely affect a computing system, including a database resource 330, by collecting and utilizing intermediate data 320 that includes, but not limited to: 1) query plans of queries; 2) actual time of query execution; 3) a deadlock scenario's query text, optimizer plans, disk problems, and/or parsing anomalies; 4) crash statistics, including parser data, compiler information, optimizer statistics, execution statistics, and/or meta data; 5) unknown errors during a vulnerable and learnable pattern in queries; 6) network related statistics at times of failure; and/or 6) schema-related statistics during execution of queries where errors or other technical issues were experienced.

It is a compilation of intermediate data from past queries that provides intelligence to some embodiments of the smart system 310 of FIG. 3. For example, when an application requests a given query, and this query is executed, but encounters issues during execution, such as taking an extended period of time to execute when compared to other queries, program code in some embodiments of the present invention analyzes the given query to determine the reason for the extended execution time, which could be an issue with the query itself and/or a concurrent issues with a computing resource, etc. Once the program code determines the cause of the delay, the program code will retain the query, as well as the cause of the issue, for use in future query analyses. In embodiments of the present invention, the program code of the smart system 310 monitors and examines individual queries and/or all the queries, in order to generate a (regularly-updated) data resource for utilization in cognitive analyses.

Returning to FIG. 3, the program code generates and maintains the cognitive repository 340 by analyzing all the query executions (or a given sample of the queries, depending on implementations) on the database resource 330 through the current time/date and progressively builds the cognitive repository 340, including intermediate data, as a learning catalogue of the queries, including failing and successful queries. Utilizing the cognitive repository 340, when an application requests a query, the program code utilizes the data in the cognitive repository 340 to predict whether the requested query, submitted at a given time, will fail or succeed. Based on this prediction, the program code takes an action related to the query, including but not limited to, cancelling execution of the query, delaying execution of the query, and/or executing the query. In some embodiments of the present invention, the program code alerts a user of the prediction and solicits input from the user (e.g., through a user interface 150, FIG. 1), enabling the user to override or accept the recommendations given by the program code.

In some embodiments of the present invention, the cognitive repository 340 is accessible remotely and configurable by a user and the program code can supplement data in the cognitive repository by accessing externally available data sources 350. A given cognitive repository 340 can learn from and be shared among a variety of different database resources. Existing database software, which can be utilized in embodiments of the present invention, includes sets of parameters which work differently in different situations. Thus, there are situations where a first set of parameters results in successful execution of a query, whereas different set of parameters result into the failure of the same query. Since it is very difficult to analyze all the different parameters that are affecting the execution of the query, program code comprising the smart system 310 (i.e., analytical engine) in some embodiments of the present invention, can access the cognitive repository 340 from anywhere, online, to identity where a particular query type is passing in one machine and failing in other. The program code determines if all the other parameters are same, other than the customized database software parameters, and can suggest configuration changes to the user that would enable the query to succeed in a database where it would previously have failed.

Figure 4:
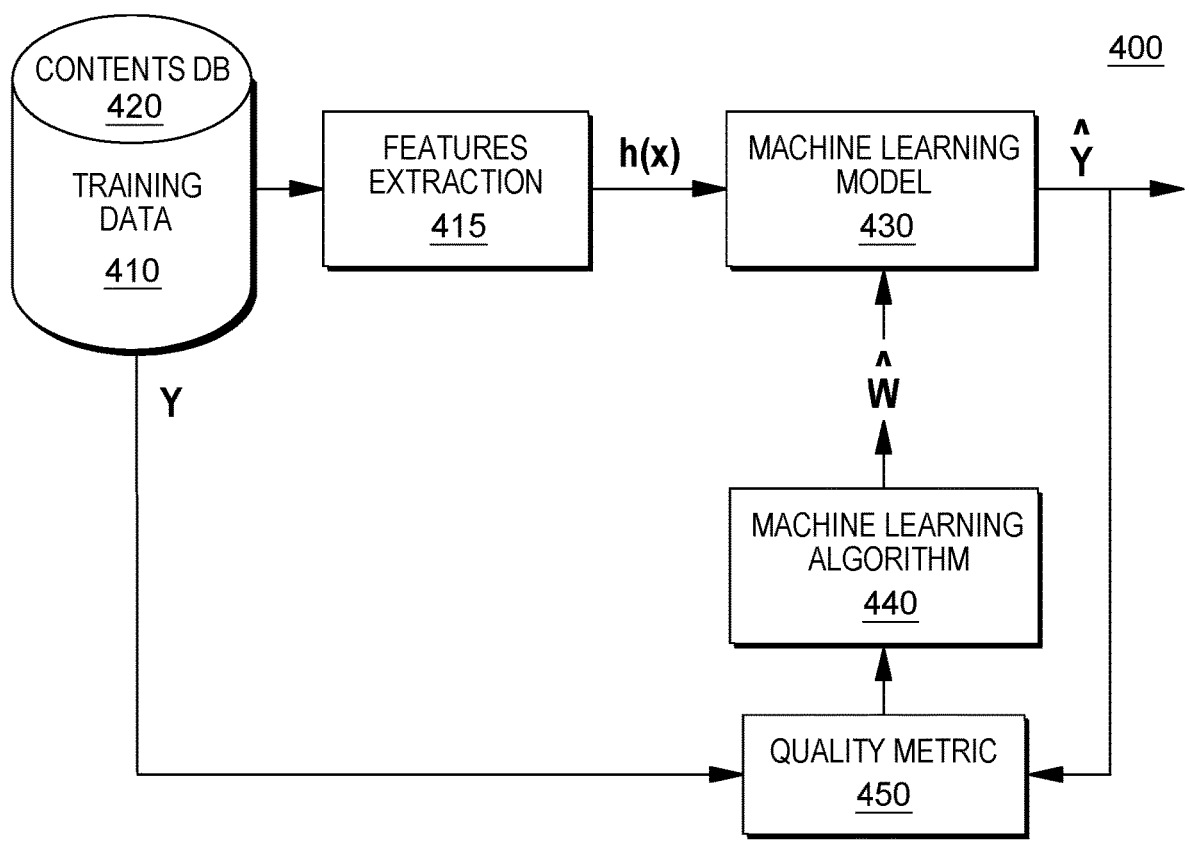
FIG. 4 is an illustration of various aspects of some embodiments of the present invention.

The program code may train the aforementioned cognitive analysis algorithms in the smart system 310 based on patterns observed across all queries, or for queries from a single client or application, or a single query. FIG. 4 is an example of a machine learning training system 400 that can be utilized to perform cognitive analyses in embodiments of the present invention. Machine learning (ML) solves problems that cannot be solved by numerical means alone. In this ML-based example, program code extracts various attributes from training data 410, which may be resident in one or more databases 420 comprising intermediate data related to various queries. The attributes are utilized to develop a predictor function, h(x), also referred to as a hypothesis, which the program code utilizes as a machine learning model 430. In identifying various attributes (e.g., patterns) in the training data 410, the program code can utilize various techniques including, but not limited to, mutual information, which is an example of a method that can be utilized to identify common attributes, including temporal attributes, in the intermediate data of various queries in an embodiment of the present invention. Further embodiments of the present invention utilize varying techniques to select features (elements, patterns, attributes, etc.), including but not limited to, diffusion mapping, principal component analysis, recursive feature elimination (a brute force approach to selecting features), and/or a Random Forest, to select the features. The program code may utilize a machine learning algorithm 440 to train a machine learning model 430 (e.g., the cognitive analysis algorithms utilized by the program code of the smart system 310, FIG. 3), including providing weights for the predictions (regarding success or failure of the queries), so that the program code can rank results and determine the appropriate actions, which may include, but are not limited to: notifying the user that the query is problematic, pre-empting execution of the query, executing the query provided that the rank meets or exceeds a threshold, executing the query with a progress tracking mechanism to enable the user to interrupt the query in case of issues, and/or tracking the query as one of the queries to be executed and monitoring the progress of the query to update the cognitive repository (e.g., FIG. 3, 340). The program can perform the ranking and based on the ranking, the determination of which action to take, in accordance with the predictor functions that comprise the machine learning model 430. The conclusions may be evaluated by a quality metric 450.

The program code selects a diverse set of training data 410, which can include, but is not limited to: 1) query plans of queries; 2) actual time of query execution; 3) deadlock scenario query text (optimizer plans, disk problems, and/or parsing anomalies); 4) crash statistics (including parser data, compiler information, optimizer statistics, execution statistics, and/or meta data); 5) unknown errors during a vulnerable and learnable pattern in queries; 6) network related statistics at times of failure; and/or 6) schema-related statistics during execution of queries where errors or other technical issues were experienced. The program code trains the machine learning model 430 to identify and weight various attributes (e.g., features, patterns) of queries. Some embodiments of the present invention may utilize a neural network (NN) to implement an action, based in predicting the success or failure of a requested query, the program code obtains (or derives) the original values from queries (including intermediate data associated with queries) to generate an array of values that to input into input neurons of the NN. Responsive to these inputs, the output neurons of the NN produce an array that includes the predicted validity of the requested queries. The program code can automatically pre-empt and/or executed queries based on the perceived validity.

In some embodiments of the present invention, the machine learning training system 400 that can be utilized to perform cognitive analyses in embodiments of the present invention may include a trained neuromorphic chip, specifically, or a neuromorphic processor, generally. Returning to FIG. 3, a neuromorphic processor or trained neuromorphic chip can be incorporated into the computing resources in the smart system 310. One example of a trained neuromorphic chip that is utilized in an embodiment of the present invention is the IBM® TrueNorth chip, produced by International Business Machines Corporation. IBM® is a registered trademark of International Business Machines Corporation, Armonk, N.Y., U.S.A. Other names used herein may be registered trademarks, trademarks or product names of International Business Machines Corporation or other companies.

The IBM® TrueNorth chip, also referred to as TrueNorth, is a neuromorphic complementary metal-oxide-semiconductor (CMOS) chip. TrueNorth includes a manycore network on a chip design (e.g., 4096 cores), each one simulating programmable silicon "neurons" (e.g., 256 programs) for a total of just over a million neurons. In turn, each neuron has 256 programmable synapses that convey the signals between them. Hence, the total number of programmable synapses is just over 268 million ($2^{28}$). Memory, computation, and communication are handled in each of the 4096 neurosynaptic cores, so TrueNorth circumvents the von-Neumann-architecture bottlenecks and is very energy-efficient.

Figure 5:
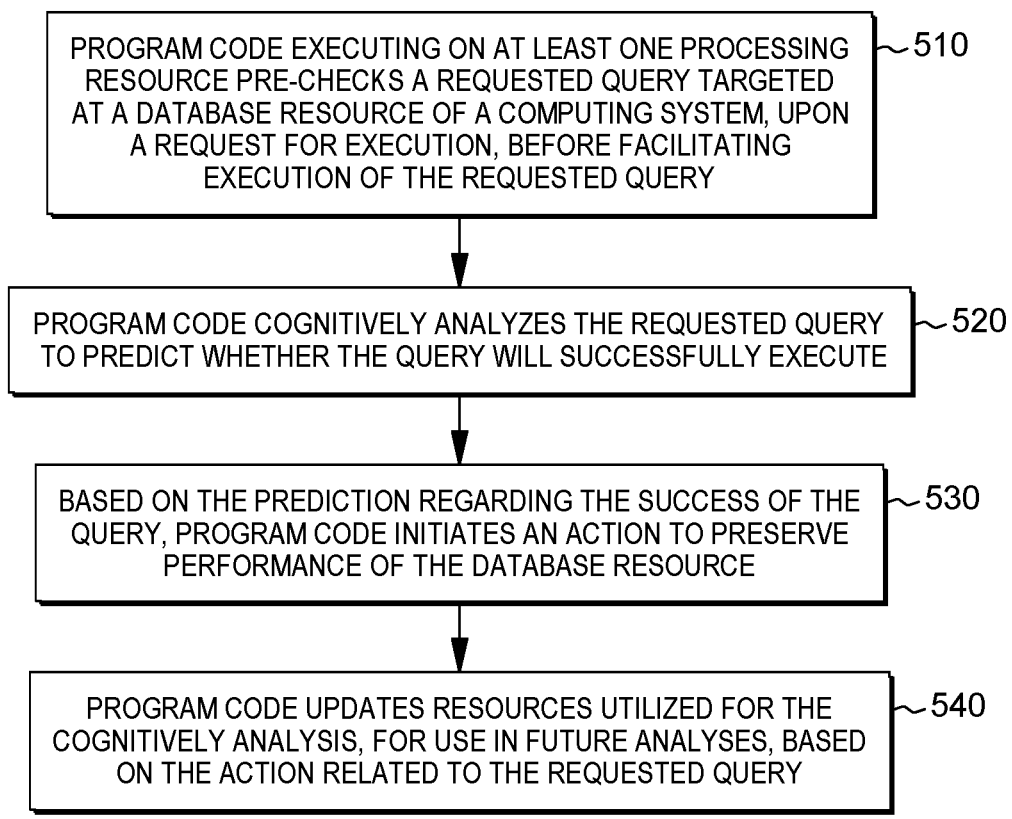
FIG. 5 is a workflow illustrating certain aspects of an embodiment of the present invention.

FIG. 5 is a workflow 500 that illustrates are implementation of certain aspects of some embodiments of the present invention into a query execution process in one or more computing resources. In embodiments of the present invention, program code executing on at least one processing resource pre-checks a requested query targeted at a database resource of a computing system, upon a request for execution, before facilitating execution of the requested query (510). In some embodiments of the present invention, this pre-check can be enabled by utilizing a parameter, e.g., QUERY_EXECUTION_PRECHECK and specifying which queries should receive this scrutiny, e.g., through a MONITOR setting. Thus, in these embodiments, the program code will only perform the pre-check if a given setting or parameter is enabled. For example, when the QUERY_EXECUTION_PRECHECK parameter is ON, and the program code is set to MONINTOR ALL queries, the program code monitors execution of all queries and will only execute the queries that the program code clears to execute. The program code in some embodiments of the present invention notifies the requestor of the query (application, user) regarding whether a given query is cleared to execute or not. Alternatively, when the QUERY_EXECUTION_PRECHECK is ON but the MONINTOR is set to INDIVIDUAL, the program code monitors particular users/applications to determine whether these queries should be executed. Another possible variation for the setting QUERY_EXECUTION_PRECHECK when ON, is the MONINTOR being set to CURRENT. The program code utilizes this setting to monitor execution parameters and if any problem is noted during execution of the current query, the program code updates a cognitive repository (FIG. 3, 340), which may include a watch list for certain queries/parameters. After monitoring a current query, based on the QUERY_EXECUTION_PRECHECK ON and MONINTOR CURRENT settings, upon completion of the execution, the program code automatically turns off the pre-check of queries, e.g., setting the parameter to QUERY_EXECUTION_PRECHECK OFF. When the parameter is set to QUERY_EXECUTION_PRECHECK OFF, the program code does not perform the pre-check (i.e., all queries will behave as in traditional way and cognitive analysis and pre-check aspects of the present invention will not be enabled).

Returning to FIG. 5, program code in embodiments of the present invention pre-checks a requested query upon a request for execution (510), the program code cognitively analyzes the requested query to predict whether the query will successfully execute (520). In determining whether a query will successfully executed (making a prediction), the program code utilizes various attributes of past queries to predict, through cognitive analysis, whether a requested query will execute successfully, or will be problematic (e.g., cause production issues, sap resources, cause errors, etc.). In addition to intermediate results from historically executed queries, the cognitive analysis of the program code can also be informed by other attributes of the query itself and the computing environment in which it executes. Thus, similarities of a requested query to these attributes or conditions can also be evaluated by the program code, in terms of attributes of a technical environment, in which the requested query is requested to be executed in.

Returning to FIG. 4, included in the attributes extracted by the program code from training data 410, which may be resident in one or more databases 420 comprising intermediate data related to various queries, are attributes related to one or more of the query structure, query execution history, query type, optimizer plan, and/or third party software relevant to the requested query. In addition to utilizing the cognitive repository (e.g., FIG. 3, 340), program code in embodiments of the present invention can include other factors in its determination of whether a requested query should be executed at a given time. These factors include, but are not limited to: the target table(s) referenced by the requested query, network connectivity from a client executing a query to the resource(s) upon which the query is to be executed, state of storage media utilized in the computing system in connection with executing a requested query, and/or usage of resources of a computing section in which the requested query is submitted for execution.

The query structure of a requested query can be relevant to the smart system (e.g., FIG. 3, 310) in predicting the success of the query. Query structure can be included in the attributes extracted by the program code training data (e.g., FIG. 4, 410), resident in one or more databases (e.g., FIG. 4, 420) comprising intermediate data related to various queries. The query structure can be utilized, in some embodiments of the present invention, to develop the machine learning model (e.g., FIG. 4, 430). As understood by one of skill in the art, a SQL query often contains many functions for performing different types of calculations. It is the task of a database engine to execute all these queries and there are certain situations where the execution of a query fails because of a problem with one of the functions. The cause of this issue may vary from being the code or an issue with the data accessed by the code of the query. However, a query with a similar function can have a reasonable probability of failing as well. In the event that the program code determines that a requested query has a probability of failure, based on a similarity of a query structure attribute with one or more previous executed queries, whose attributes the program code maintains in cognitive repository (e.g., FIG. 3, 340), the program code can take an action to mitigate damage caused by the execution of the query. Depending upon the anticipated severity of an issue predicted, the program code can executive the requested query at a low priority or halt execution of the query. In some embodiments of the present invention, the program code informs a user of an anticipated issue (e.g., utilizing interface 150, FIG. 1) and provides the user with an option to execute the query despite the warning.

As aforementioned, the query structure of a requested query can be relevant to the smart system 310 (FIG. 3) and can be included in the attributes utilized to create patterns in to train the machine learning algorithms, in embodiments of the present invention. In some situations an optimizer (e.g., FIG. 2, 230) may create a plan with issues, including but not limited to join problems and/or a faulty optimizer plan. Utilizing an incorrect plan to execute a query can cause the broadcast of a large table and thus, result in a protracted execution of a query, which can potentially lead to a timeout. In some embodiments of the present invention, the program code learns from query execution history, query type, as well as the type of table being referenced, and when the program code recognizes this type of issue with a requested query, the program code can prompt a user (e.g., utilizing interface 150, FIG. 1) to either update statistics or to block execution of the query, to maintain the integrity of the database (e.g., database resource 330, FIG. 3).

The target table(s) of a requested query can also be relevant to the program code of the smart system (e.g., FIG. 3, 310) in predicting the success of the query. As understood by one of skill in the art, there will be many situations where the target table is in the deadlock state. In situations any query referring to the same table will also either fail or will enter the deadlock state. When an optimizer (e.g., FIG. 2, 230) generates different plans for a query, the optimizer does not take the state of target tables into consideration. Thus, the optimizer would not factor the state of the table into its considerations, even if the table which the SQL query is referring to is using a deadlock state. In this situation, in some embodiments of the present invention, the program code will cause the proposed analytical engine to wait for the table to get out of the deadlock state, or will stop the query from executing altogether, based on the state of the table.

As discussed earlier, different database resources may utilize different software and different software versions. As a result, while a requested query would execute cleanly on a database running one version of a particular software, changing the software version and/or the software can affect the success of the query. Thus, in some embodiments of the present invention, the machine learning model (e.g., FIG. 4, 430) in embodiments of the present invention is generated utilizing data that includes software-related data regarding the historical queries, for example, the software versions running on the database resources that generated the recorded results. As software and versions can change, the program code utilizes external data so that if a requested query is submitted for execution on a database with software that is recently updated, or otherwise different than expected, the program code of the smart system (e.g., FIG. 3, 310), utilizing the aforementioned cognitive analysis algorithms, can predict the failure and/or success of the query based, at least in part, by data from external sources, such as other computing environments. In some embodiments of the present invention, the smart system (e.g., FIG. 3, 310), which includes an analytical engine, utilizes various (e.g., dedicated or shared) network connections to contact neighboring clients for data relevant to executing queries with the unexpected software. The program code can also analyze whether a query will succeed, based on changing the software on a client requesting the query, or on the database server, and can communicate configuration changes to the client to render the requested query successful.

In performing a cognitive analysis to determine whether to enable or block execution of a requested query (from a client, user, application, etc.), the program code in embodiments of the present invention can also predict an expectation of success or failure for a requested query based, at least in part, on network-related considerations. Thus, these network considerations can be analyzed by the program code of the smart system (e.g., FIG. 3, 310), utilizing the aforementioned cognitive analysis algorithms. The network in a computing environment (e.g., FIG. 1, computing environment 100) relays communications between different resources (e.g., FIG. 1, query execution unit 110, database system 120, real-time data gathering and prediction component 130, machine learning algorithms 140, and user interface 150) and therefore plays a role in the execution of a query. When a client requesting a query is remote to a server (e.g., FIG. 1, query execution unit 110), the execution of the query can be bottle-necked by the network speed. A remotely requested query, which involves the broadcast of a large amount of data, may fail because the query times out due to slow network speed. The execution of search queries can also cause delays in the execution of other queries. In some embodiments of the present invention, when a user/client/application requests the execution of a given query, before executing the query, based on performing a cognitive analysis on the requested query that relies, in part, on network considerations, the program code in embodiments of the present invention alerts the user (e.g., utilizing interface 150, FIG. 1) about a predicted execution time for the query and provides the user with the choice of whether to proceed with executing the query. In some embodiments of the present invention, the program code provides, to the user (e.g., utilizing interface 150, FIG. 1), based on the execution history of different queries and past network speed data related to these executions, an optimal time of execution of the requested query. This aspect may be particularly useful in scheduling the execution of search queries. In some embodiments of the present invention, rather than empower a user to proceed with or cancel execution of a query, the program code schedules execution of queries predicted to be time-intensive, in accordance with part resource availability, per the historical data.

The size of resources upon which requested queries are to execute (e.g., FIG. 3, database resource 330) can also be a consideration in the cognitive analysis in some embodiments of the present invention. An optimizer (e.g., FIG. 2, 230) may not be configured to account for the size and the state(s) of the database resource(s). Upon submission of the query for execution, the query execution unit (e.g., FIG. 1, 110), cannot successfully complete the query because of a query failure due to a corrupted hard disc. In some embodiments of the present invention, as part of the cognitive analysis, the program code will check the integrity of the resources upon which requested queries are to execute (e.g., FIG. 3, database resource 330) before allowing a requested query to execute.

In some embodiments of the present invention, the program code may utilize heuristic algorithms or a rule based system, when considering one or more components of a requested query, in order to determine whether to pre-empt or execute the requested query (based on predicting its chance of success or failure). In some embodiments of the present invention, one or more components of the query (e.g., objects of the database resource referred to in the requested query, query type, syntax of the requested query, query structure, and conditions defined in the requested query) may influence a rule that determines whether to pre-empt automatically or to execute the requested query (or, alternatively, to alert the user and to request user input regarding either action). In making this determination, the program code may utilize one or more algorithms, heuristics, and/or rules. In embodiments of the present invention, the program code implements a decision on the requested, based on one or more elements of the query.

Returning to FIG. 5, based on the prediction regarding the success of the query, the program code initiates an action to preserve performance of the database resource (530). These actions may, include, but are not limited to, executing the query, pre-empting the query, cancelling execution of the query, delaying execution of the query executing the query with a warning, and/or causing the query execution to fail. For example, in some embodiments of the present invention, the program code pre-empts the requested query based on determining that, if executed, the query will hog system resources and thus, the program code pre-empts the query to prevent denials of service to other queries. In some embodiments of the present invention, the program code determines which action to take based on the prediction, which may be a binary value, a quantitative ranked value, or a qualitative result. In some embodiments of the present invention, the action by the program code can include sending an alarm or a notification to a user, alerting the user to the request to execute a bad query (e.g., a query that can lead to a production issues, tax the system, etc.). In some embodiments of the present invention, whether the program code sends an alarm is dictated based on whether the prediction meets or exceeds a given threshold; the threshold can be a default threshold or a user-defined threshold. The program code updates resources utilized for the cognitive analysis, for use in future analyses, based on the action related to the requested query (540).

Embodiments of the present invention include a computer-implemented method, a computer program product, and a computer system, where program code executed by one or more processors monitors, in a computing system comprising a database resource, communications between one or more clients to a query engine, to identify requests from the one or more clients to the query engine to execute queries on the database resource. Based on identifying a requested query destined for execution by the query engine, the program code applies cognitive analysis algorithms to parse components of the requested query, to identify components in the requested query that indicate an execution success measure for the requested query. The program code determines the execution success measure for the requested query and assigning an execution action to the requested query, based on the execution success measure, where the execution action is selected from the group consisting of: pre-empting the requested query and executing the requested query. The program code facilitates the execution action, on the requested query. In some embodiments of the present invention, the components are selected from the group consisting of: objects of the database resource referred to in the requested query, query type, syntax of the requested query, query structure, and conditions defined in the requested query In some embodiments of the present invention, the program code analyzes a portion of queries from the one or more clients to the query engine utilizing heuristic techniques and cognitive learning. The program code generates the cognitive analysis algorithms, based on the analyzing.

In some embodiments of the present invention, the program code generates the cognitive analysis algorithms, by: analyzing intermediate data of queries preceding the requested query from the one or more clients to the query engine, where the queries were executed by the query engine, where intermediate data includes data produced by the query engine during execution of the queries, and where a portion of the queries failed; identifying, by the one or more processors, common attributes in the intermediate data, where the common attributes are associated with outcomes of the queries; and generating utilizing the common attributes, a predictor function, where the predictor function includes the cognitive analysis algorithms. In some embodiments of the present invention, the program code, the attributes are selected from the group consisting of: costs of queries, actual time taken to complete the queries, workloads on the computing system during execution of the queries, elements of the portion of the queries that failed. In some embodiments of the present invention, the program code, the elements of the portion of the queries that failed are selected from the group consisting of: target tables, type of joins, and filter conditions.

In some embodiments of the present invention, the program code, identifying the requested query by the program code includes: during the monitoring, checking the requests from the one or more clients to the query engine to execute the queries for settings associated with the queries; based on a value of the settings of the requested query, determining that the value of the setting triggers a cognitive analysis of the requested query prior to execution of the requested query; and executing a remainder of the queries associated with the requests to execute the queries, where the settings of the remainder of the queries comprise a different value than the value.

In some embodiments of the present invention, the program code, the program code updates the cognitive analysis algorithms, by: analyzing intermediate data of the remainder of the queries, where the intermediate data includes data produced by the query engine during execution of the remainder of the queries, and where a portion of the remainder of the queries failed; identifying common attributes in the intermediate data, where the common attributes are associated with outcomes of the queries; and updating, by the one or more processors, utilizing the common attributes, a predictor function, where the predictor function includes the cognitive analysis algorithms.

In some embodiments of the present invention, the components in the requested query comprise target tables, type of joins, and filter condition.

In some embodiments of the present invention, the program code determining the execution success measure is based on the program code identifying the components and based on a current status of one or more computing resources comprising the computing system.

In some embodiments of the present invention, the execution action includes executing the requested query at a later time based on the current status of one or more computing resources comprising the computing system being unavailable.

In some embodiments of the present invention, the program code, the program code applying the cognitive analysis algorithms includes the program code analyzing the requested query based on query structure, query execution history, query type, optimizer plan, and third party software relevant to the requested query.

In some embodiments of the present invention, the program code, the program code applying the cognitive analysis algorithms, includes the program code utilizing one or more of natural language processing algorithms or cognitive analytics to identify the components.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, in FIG. 3, the smart system 310, database resource 330, cognitive repository 340, and can each be understood as a cloud computing node 10 (FIG. 6) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 6, computer system/server 12 that can be utilized as cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. As understood by one of skill in the art, another area in which aspects of the present invention can be utilized is quantum computing. For example, aspects of embodiments of the present invention can be utilized in conjunction with solving the so-called "dinner party problem" (i.e., "How many people must you have at dinner to ensure that there are a subset of 3 people who all either mutual acquaintances, or mutual strangers?"). Because aspects of the present invention generate correlations between IT issues and business events, utilizing sources both internal and external to a given computing system, program code in embodiments of the present invention is applicable to correlation building to solve other problems. As embodiments of the present invention can be used as an alternative/improved solution to the correlation between business and IT environments for large IT environments with complex businesses processes, applying this functionality to the "dinner party problem" and other situations where correlation building is desired would be advantageous.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
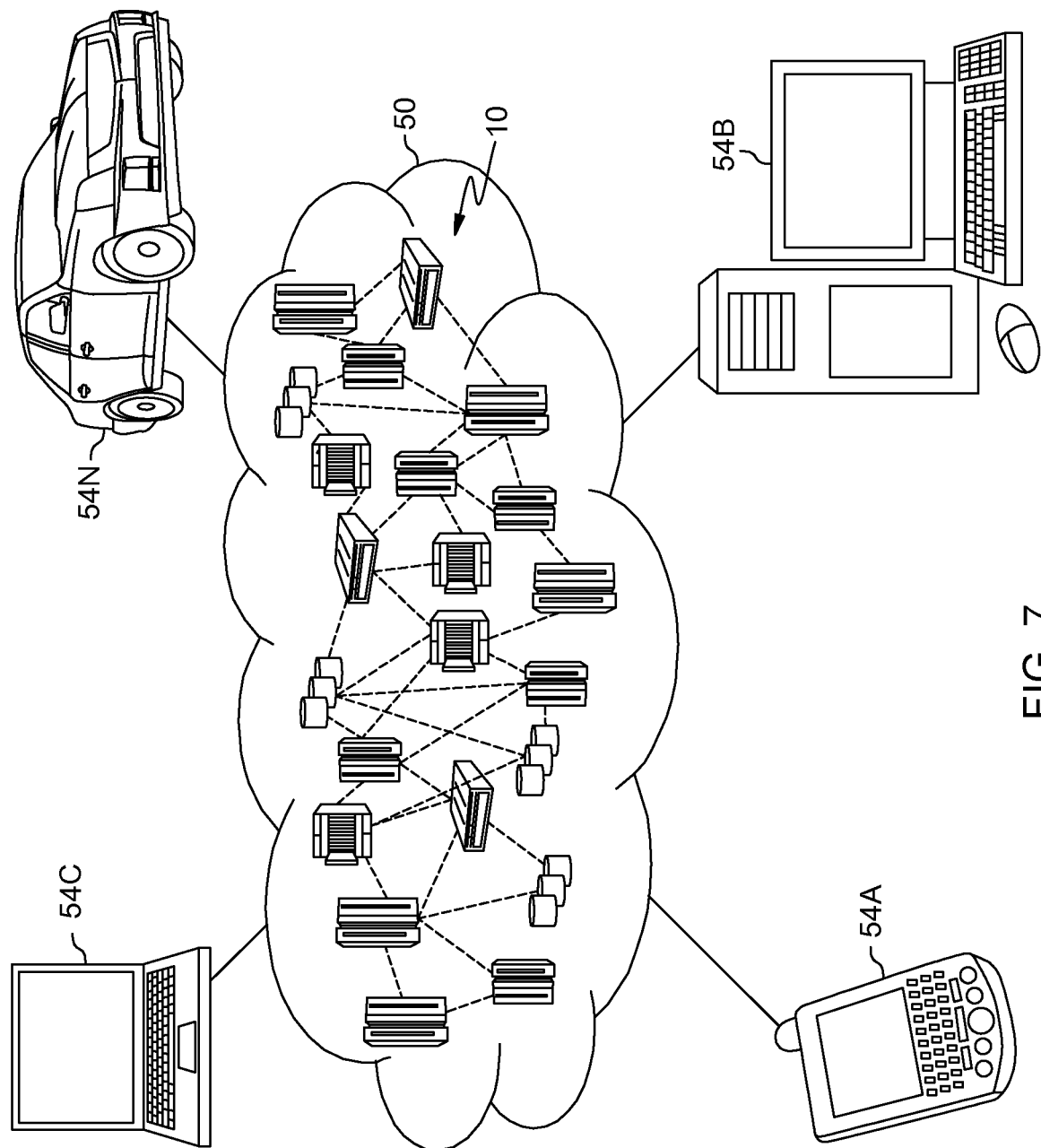
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
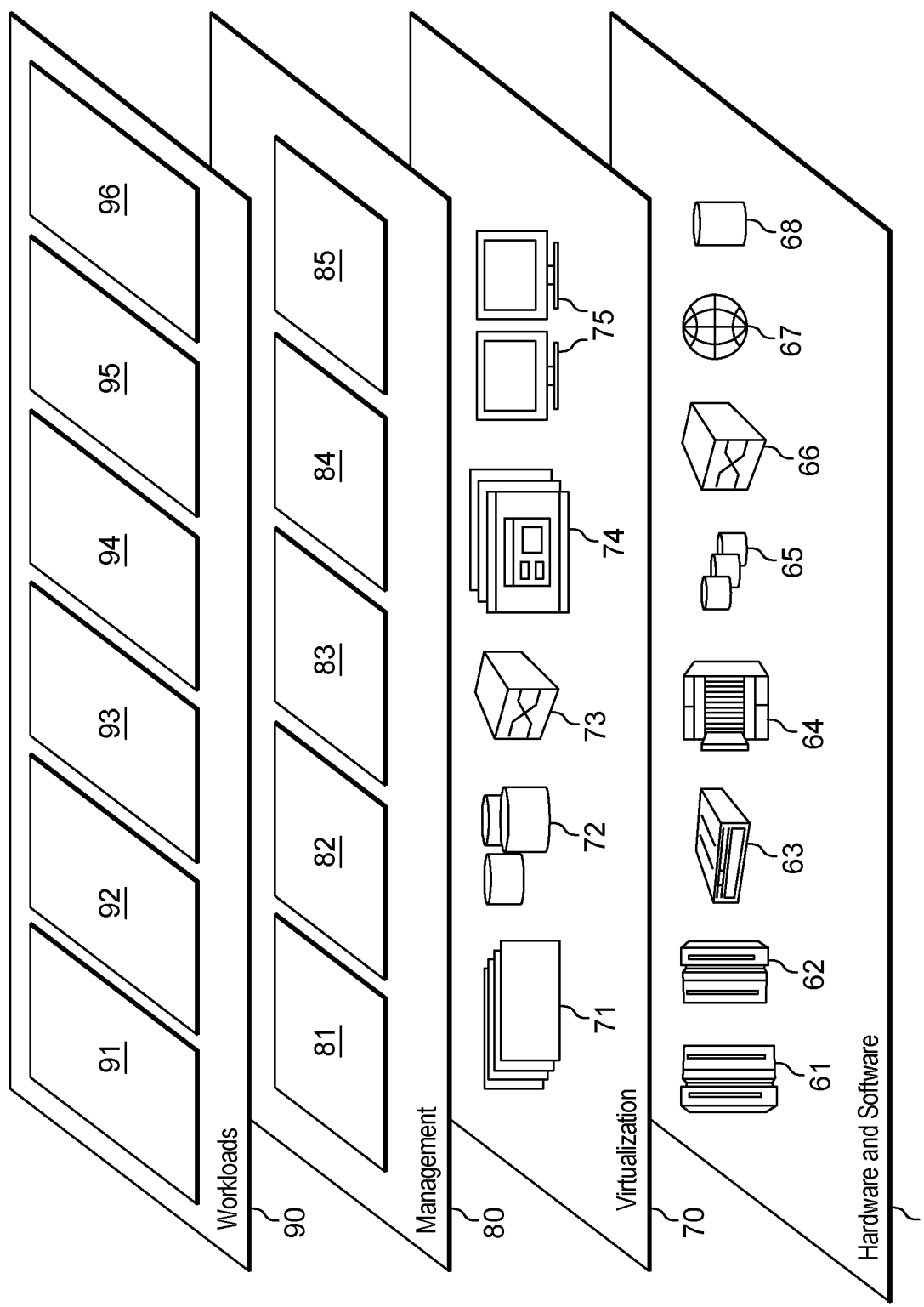
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evaluating requested queries for execution or pre-emption 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    monitoring, by one or more processors, in a computing system comprising a database resource, communications between one or more clients to a query engine, to identify requests from the one or more clients to the query engine to execute queries on the database resource;
    based on identifying a requested query destined for execution by the query engine at a given time, applying, by the one or more processors, cognitive analysis algorithms to parse components of the requested query, to identify components in the requested query that indicate an execution success measure for the requested query, wherein the execution success measure is selected from the group consisting of: a prediction indicating an anticipated failure based on executing the requested query at the given time and a prediction indicating an anticipated success based on executing the requested query at the given time;
    determining, by the one or more processors, the execution success measure for the requested query at the given time and assigning an execution action to the requested query, based on the execution success measure, wherein the execution action is selected from the group consisting of: pre-empting the requested query based on the execution success measure being the prediction indicating the anticipated failure and executing the requested query based on the execution success measure being the prediction indicating the anticipated success; and
    facilitating, by the one or more processors, the execution action, on the requested query.

2. The computer-implemented method of claim 1, wherein the components are selected from the group consisting of: objects of the database resource referred to in the requested query, query type, syntax of the requested query, query structure, and conditions defined in the requested query.

3. The computer-implemented method of claim 1, further comprising:
    analyzing, by the one or more processors, a portion of queries from the one or more clients to the query engine utilizing heuristic techniques and cognitive learning; and
    generating, by the one or more processors, the cognitive analysis algorithms, based on the analyzing.

4. The computer-implemented method of claim 1, further comprising:
    generating, by the one or more processors, the cognitive analysis algorithms, wherein the generating comprises:
        analyzing, by the one or more processors, intermediate data of queries preceding the requested query from the one or more clients to the query engine, wherein the queries were executed by the query engine, wherein intermediate data comprises data produced by the query engine during different phases of execution of the queries and not at a conclusion of the execution of the queries, and wherein a portion of the queries failed;
        identifying, by the one or more processors, common attributes in the intermediate data, wherein the common attributes are associated with outcomes of the queries; and
        generating, by the one or more processors, utilizing the common attributes, a predictor function, wherein the predictor function comprises the cognitive analysis algorithms.

5. The computer-implemented method of claim 4, wherein the attributes are selected from the group consisting of: costs of queries, actual time taken to complete the queries, workloads on the computing system during execution of the queries, elements of the portion of the queries that failed.

6. The computer-implemented method of claim 4, wherein the elements of the portion of the queries that failed are selected from the group consisting of: target tables, type of joins, and filter conditions.

7. The computer-implemented method of claim 1, wherein identifying the requested query further comprises:
    during the monitoring, checking, by the one or more processors, the requests from the one or more clients to the query engine to execute the queries for settings associated with the queries;
    based on a value of the settings of the requested query, determining, by the one or more processors, that the value of the setting triggers a cognitive analysis of the requested query prior to execution of the requested query; and
    executing, by the one or more processors, a remainder of the queries associated with the requests to execute the queries, wherein the settings of the remainder of the queries comprise a different value than the value.

8. The computer-implemented method of claim 7, further comprising:
updating, by the one or more processors, the cognitive analysis algorithms, wherein the updating comprises:
analyzing, by the one or more processors, intermediate data of the remainder of the queries, wherein the intermediate data comprises data produced by the query engine during different phases of execution of the remainder of the queries and not at a conclusion of the execution of the remainder of the queries, and wherein a portion of the remainder of the queries failed;
identifying, by the one or more processors, common attributes in the intermediate data, wherein the common attributes are associated with outcomes of the queries; and
updating, by the one or more processors, utilizing the common attributes, a predictor function, wherein the predictor function comprises the cognitive analysis algorithms.

9. The computer-implemented method of claim 1, wherein the components in the requested query comprise target tables, type of joins, and filter condition.

10. The computer-implemented method of claim 1, wherein determining the execution success measure is based on identifying the components and based on a current status of one or more computing resources comprising the computing system.

11. The computer-implemented method of claim 1, wherein the execution action comprises executing the requested query at a later time based on the current status of one or more computing resources comprising the computing system being unavailable.

12. The computer-implemented method of claim 1, wherein applying the cognitive analysis algorithms comprises analyzing the requested query based on query structure, query execution history, query type, optimizer plan, and third party software relevant to the requested query.

13. The computer-implemented method of claim 1, wherein applying the cognitive analysis algorithms comprises utilizing one or more of natural language processing algorithms or cognitive analytics to identify the components.

14. A computer program product comprising:
a computer readable storage medium readable by one or more processors and storing instructions for execution by the one or more processors for performing a method comprising:
monitoring, by the one or more processors, in a computing system comprising a database resource, communications between one or more clients to a query engine, to identify requests from the one or more clients to the query engine to execute queries on the database resource;
based on identifying a requested query destined for execution by the query engine at a given time, applying, by the one or more processors, cognitive analysis algorithms to parse components of the requested query, to identify components in the requested query that indicate an execution success measure for the requested query, wherein the execution success measure is selected from the group consisting of: a prediction indicating an anticipated failure based on executing the requested query at the given time and a prediction indicating an anticipated success based on executing the requested query at the given time;
determining, by the one or more processors, the execution success measure for the requested query at the given time and assigning an execution action to the requested query, based on the execution success measure, wherein the execution action is selected from the group consisting of: pre-empting the requested query based on the execution success measure being the prediction indicating the anticipated failure and executing the requested query based on the execution success measure being the prediction indicating the anticipated success; and
facilitating, by the one or more processors, the execution action, on the requested query.

15. The computer program product of claim 14, wherein the components are selected from the group consisting of: objects of the database resource referred to in the requested query, query type, syntax of the requested query, query structure, and conditions defined in the requested query.

16. The computer program product of claim 14, the method further comprising:
analyzing, by the one or more processors, a portion of queries from the one or more clients to the query engine utilizing heuristic techniques and cognitive learning; and
generating, by the one or more processors, the cognitive analysis algorithms, based on the analyzing.

17. The computer program product of claim 16, the method further comprising:
generating, by the one or more processors, the cognitive analysis algorithms, wherein the generating comprises:
analyzing, by the one or more processors, intermediate data of queries preceding the requested query from the one or more clients to the query engine, wherein the queries were executed by the query engine, wherein intermediate data comprises data produced by the query engine during different phases of execution of the queries and not at a conclusion of the execution of the queries, and wherein a portion of the queries failed;
identifying, by the one or more processors, common attributes in the intermediate data, wherein the common attributes are associated with outcomes of the queries; and
generating, by the one or more processors, utilizing the common attributes, a predictor function, wherein the predictor function comprises the cognitive analysis algorithms.

18. The computer program product of claim 17, wherein the attributes are selected from the group consisting of: costs of queries, actual time taken to complete the queries, workloads on the computing system during execution of the queries, elements of the portion of the queries that failed, and wherein the elements of the portion of the queries that failed are selected from the group consisting of: target tables, type of joins, and filter conditions.

19. A system comprising:
a memory;
one or more processors in communication with the memory;
program instructions executable by the one or more processors via the memory to perform a method, the method comprising:
monitoring, by the one or more processors, in a computing system comprising a database resource, communications between one or more clients to a query engine, to identify requests from the one or more clients to the query engine to execute queries on the database resource;

based on identifying a requested query destined for execution by the query engine at a given time, applying, by the one or more processors, cognitive analysis algorithms to parse components of the requested query, to identify components in the requested query that indicate an execution success measure for the requested query, wherein the execution success measure is selected from the group consisting of: a prediction indicating an anticipated failure based on executing the requested query at the given time and a prediction indicating an anticipated success based on executing the requested query at the given time;

determining, by the one or more processors, the execution success measure for the requested query at the given time and assigning an execution action to the requested query, based on the execution success measure, wherein the execution action is selected from the group consisting of: pre-empting the requested query based on the execution success measure being the prediction indicating the anticipated failure and executing the requested query based on the execution success measure being the prediction indicating the anticipated success; and facilitating, by the one or more processors, the execution action, on the requested query.

20. The system of claim 19, wherein the components are selected from the group consisting of: objects of the database resource referred to in the requested query, query type, syntax of the requested query, query structure, and conditions defined in the requested query.

* * * * *